(12) United States Patent
Al-Mehthel et al.

(10) Patent No.: US 8,062,413 B1
(45) Date of Patent: Nov. 22, 2011

(54) UTILIZATION OF HEAVY OIL FLY ASH TO IMPROVE ASPHALT BINDER AND ASPHALT CONCRETE PERFORMANCE

(75) Inventors: Mohammed Al-Mehthel, Dhahran (SA); Hamad L Al-Abdul Wahhab, Dhahran (SA); Ibenalwaleed A. Hussein, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 12/917,043

(22) Filed: Nov. 1, 2010

(51) Int. Cl.
C08L 95/00 (2006.01)
C10C 3/00 (2006.01)

(52) U.S. Cl. ..................... 106/281.1; 106/705

(58) Field of Classification Search .................. 106/705, 106/DIG. 1, 281.1
See application file for complete search history.

(56) References Cited

U.S. PATENT DOCUMENTS

| | | | |
|---|---|---|---|
| 3,962,080 A | 6/1976 | Dulin et al. | |
| 4,038,095 A | 7/1977 | Nicholson | |
| 5,449,401 A | 9/1995 | Zuberer | |
| 6,440,205 B1 | 8/2002 | Bailey et al. | |
| 6,824,600 B2 | 11/2004 | Bailey et al. | |
| 7,276,114 B2 | 10/2007 | Polston | |
| 2008/0300346 A1 | 12/2008 | Blackmon et al. | |

FOREIGN PATENT DOCUMENTS

| | | | |
|---|---|---|---|
| DE | 4210224 C1 | | 5/1993 |
| JP | 60-19086 A | * | 1/1985 |
| JP | 3037266 A | | 2/1991 |
| JP | 2002256508 A | | 9/2002 |
| RU | 2102354 C1 | * | 1/1998 |
| SU | 573527 A | * | 2/1975 |

OTHER PUBLICATIONS

Derwent-Acc-No. 2005-128618, abstract of KR 2004082094 A (Sep. 2004).*
Derwent-Acc-No. 2008-J64591, abstract of KR 796048 B1 (Jan. 2008).*
Derwent-Acc-No. 2009-E47339, abstract of KR 860122 B1 (Sep. 2008).*

* cited by examiner

Primary Examiner — Anthony Green
(74) Attorney, Agent, or Firm — Bracewell & Giuliani LLP

(57) ABSTRACT

Disclosed herein are an asphalt concrete mixture, an asphalt binder composition, and methods of preparing the related compositions. The asphalt binder compositions include heavy oil fly ash that contains more than about 90 wt. % carbon. The compositions are capable of being performance graded. The binder can be used to modify the asphalt and also as a filler in asphaltic concrete compositions.

14 Claims, 1 Drawing Sheet

UTILIZATION OF HEAVY OIL FLY ASH TO IMPROVE ASPHALT BINDER AND ASPHALT CONCRETE PERFORMANCE

BACKGROUND OF THE INVENTION

1. Field of the Invention

Disclosed herein are heavy oil fly ash-modified asphalt binders and asphaltic compositions and methods of making same.

2. Description of the Related Art

As modern commerce depends on reliable and cost-effective methods for delivering products from suppliers to users, the availability of durable and reliable highways, roads and other support surfaces for vehicles is vital for sustaining a modern economy. To provide better support surfaces, highways, roads, and sidewalks are commonly paved with a layer or mat of asphaltic concrete that is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalts are essentially mixtures of bitumen, as binder, with aggregate, in particular filler, sand and stones. There are many different types of asphalts available and their characteristics can vary quite significantly. The design of asphalts for bituminous paving application is a complex process of selecting and proportioning materials to obtain the desired properties in the finished construction while minimize undesirable characteristics.

In evaluating and adjusting mix designs, the aggregate gradation and the binder content in the final mix design are balanced between the stability and durability requirements for the intended use. The final goal of mix design is to achieve a balance among all of the desired properties. Binders and various polymers have been investigated for reaching similar goals, and other modifications have been studied.

Unsaturated thermoplastic elastomers like styrene-butadiene-styrene (SBS) block copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. Due to their fragility, they are typically used as virgin polymers. This can result in a significant cost increase for the product. While SBS is recognized for performance benefits, research has focused on most cost effective modifiers in exchange for sacrificing superior performance.

Olefinic polymers have been investigated for use as modifiers. They are available in large quantities with different mechanical properties and at low cost. Polyethylene (PE) and polypropylene (PP) are plastomers. They bring a high rigidity (i.e., lack of elasticity, resistance to bending) to the product and significantly reduce deformations under traffic load. Due to their non-polar nature, PE and PP suffer from the drawback that they are almost completely immiscible with asphalt, and are thus limited in use.

Conventional asphalts often do not retain sufficient elasticity in use and, also, exhibit a plasticity range which is too narrow for use in many modern applications such as road construction. The characteristics of road asphalts can be improved by incorporating into them an elastomeric-type polymer. There exists a wide variety of polymers that can be mixed with asphalt. Of these, SBS is a commonly used polymer in asphalt modification. The modified asphalts thus obtained commonly are referred to variously as bitumen/polymer binders or asphalt/polymer mixes. There is a need for a modification to hotmix asphalt concrete mixes that would increase the resistance to permanent deformation while maintaining or increasing the modulus of the mix at intermediate temperatures without affecting the binder properties significantly.

The bituminous binders, even of the bitumen/polymer type, which are employed at the present time in road applications often, do not have the optimum characteristics at low enough polymer concentrations to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant which promotes cross-linking of the polymer molecules until the desired asphalt properties are met. This reactant typically is sulfur in a form suitable for reacting.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. This problem can be ameliorated by adding carbon or ash to sulfur. $H_2S$ evolution starts at temperatures higher than 150° C., so that the application at temperatures up to 150° C. avoids pollution and safety problems. However, $H_2S$ evolution starts well below 150° C., i.e. about 130° C., which is undesirable from an environmental perspective. Moreover, below 120° C., neither the reaction of the asphalt and sulfur nor the cross-linking of the SBS/sulfur blend could take place.

Besides performance and environmental issues associated with many types of asphalt modifiers, many of the polymers that are used to modify asphalt compositions are expensive and can be difficult to obtain in remote areas of the world.

A need exists for a type of binder that can be used in various asphalt compositions and applications. It would be advantageous if the binder is readily available. Furthermore, it would also be advantageous if the binder is environmentally friendly and possesses adequate performance properties that enable it to be used in various applications.

SUMMARY OF THE INVENTION

In view of the foregoing, asphaltic concrete mixtures, asphaltic binders, and methods of preparing the asphaltic concrete mixtures are provided as embodiments of the present invention. For example, as an embodiment of the present invention, an asphaltic concrete mixture with improved properties relative to rutting, deformation, stability, and modulus is provided. In this embodiment, the asphaltic concrete mixture includes heavy oil fly ash and asphaltic concrete. The heavy oil fly ash is present in a range of about 3 wt. % to about 10 wt. % of the asphaltic concrete mixture. The asphaltic concrete comprises aggregate and bitumen.

In embodiments of the present invention, the heavy oil fly ash contains more than about 90 wt. % carbon. The heavy oil fly ash is producing by burning fuel oil. In an aspect, the heavy oil fly ash is a combustion reaction product formed through burning fuel oil.

As an embodiment of the present invention, another asphaltic concrete mixture with improved properties relative to rutting, deformation, stability, and modulus is provided. In this embodiment, the asphaltic concrete mixture includes heavy oil fly ash and asphaltic concrete. The heavy oil fly ash is present in a range of about 3 wt. % to about 10 wt. % of the asphaltic concrete mixture. The asphaltic concrete includes about 95 parts by weight aggregate and about 5 parts by weight bitumen. In this embodiment, the asphaltic concrete mixture is substantially free of a polymeric modifier.

As another embodiment of the present invention, a binder composition comprising a heavy oil fly ash composition for use with asphaltic concrete for improved properties relative to rutting, deformation, stability, and modulus is provided. The heavy oil fly ash includes a combustion reaction product formed through burning fuel oil. As with other embodiments of the present invention, the heavy oil fly ash composition includes more than about 90 wt. % carbon.

Besides compositional embodiments, methods of preparing the compositions are also provided as embodiments of the present invention. For example, a method of preparing an asphalt concrete composition with improved properties relative to rutting, deformation, stability, and modulus is provided. In this embodiment, the method includes the steps of preparing a binder comprising a heavy oil fly ash. The heavy oil fly ash is generally present in an amount effective to provide sufficient resistance to deformation for the composition. The binder is combined with bitumen to produce a modified bitumen. The modified bitumen is then combined with aggregate to produce the asphalt concrete composition.

As another example, as an embodiment, a method of preparing an asphalt concrete composition with improved properties relative to rutting, deformation, stability, and modulus is provided. In this embodiment, the method includes preparing a binder comprising a heavy oil fly ash and combining the binder with asphalt concrete to produce the asphalt concrete composition. The heavy oil fly ash is present in an amount effective to provide sufficient resistance to deformation for the composition. The asphalt concrete comprises aggregate and bitumen.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Figure 1:
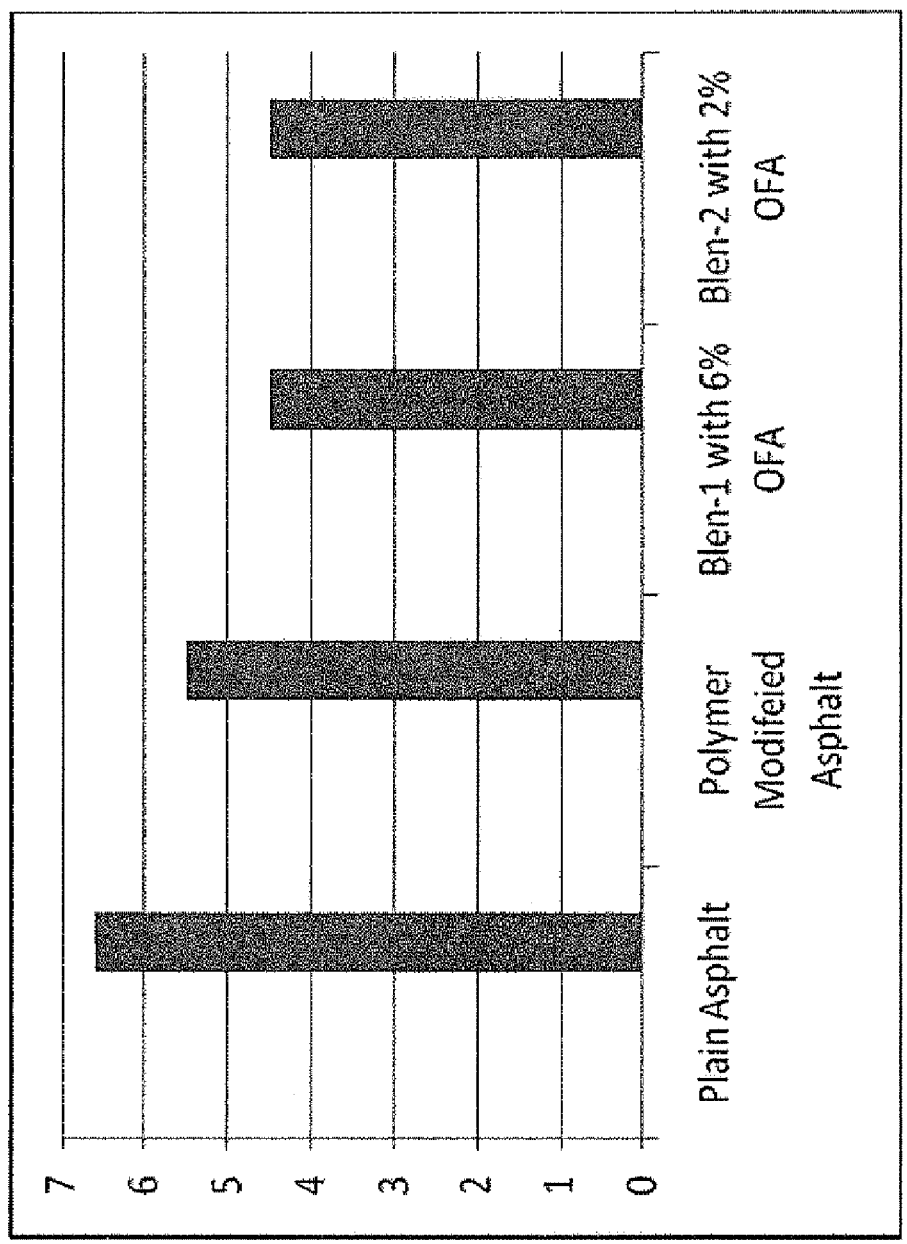
FIG. 1 is a chart demonstrating deformation versus mix type comparing prior art asphalt mixes with asphalt mixes made in accordance with embodiments of the present invention.

It is desirable for asphaltic concrete, including asphalt and aggregate, asphalt compositions for resurfacing asphaltic concrete, and similar asphalt compositions to exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

The grades and characteristics of asphalt paving products are defined by various professional organizations, such as the Asphalt Institute. For example, Rolling Thin Film Oven (RTFO) and Pressure Aging Vessel (PAV) studies are used to simulate binder aging (hardening) characteristics. Dynamic Shear Rheometers (DSR) are used to measure binder properties at high and intermediate temperatures. This is used to predict permanent deformation or rutting and fatigue cracking. Industry custom uses the short form RTFO DSR to indicate the temperature at which a sample will show sufficient rutting resistance after rolling thin film oven (RTFO) aging (minimum rutting resistance as defined as a "$G^*/\sin \ddot{y}$" over 2.20 kPA and measured by a dynamic shear rheometer (DSR)). Fatigue cracking is a series of small, jagged, interconnecting cracks caused by failure of the asphalt concrete surface under repeated traffic loading. Bending Beam Rheometers (BBR) are used to measure binder properties at low temperatures. These values predict thermal or low temperature cracking. Various industry standards, such as the Superpave standard, exist for defining such procedures for these experiments and measurement.

Asphalt grading is given in accordance with accepted standards in the industry, such as PG 64-22. The PAV-DSR temperature and the BBR-M temperature are two additional useful parameters of asphalt paving products.

Asphaltic concrete comprises asphalt combined with aggregates in various rations, one exemplary ration being approximately 95 parts by weight of aggregate to approximately 5 parts by weight of liquid asphalt. The asphaltic cement is used to bind together the aggregate material and limit its mobility when a load is applied. The aggregate is usually a mixture of sand, gravel, and stone; the largest pieces of aggregate having a diameter equal to about ⅔ the thickness of the asphalt mat. The aggregate has crushed particles to provide sharp edges in the gravel and stone which, when combined with the liquid asphalt, create an aggregate interlock which improves the strength of the mat. The aggregate and liquid asphalt are heated and mixed to form an asphalt paving composition called hot-mix asphalt (HMA). Thermal stress of asphalt is stress resulting from non-uniform temperature distribution or differential thermal expansion.

Elastic modulus is sometimes called Young's modulus. An elastic modulus (E) can be determined for a solid material and represents a constant ratio of stress and strain (a stiffness): E=stress/strain. A material is elastic if it is able to return to its original shape or size immediately after being stretched or squeezed. Almost all materials are elastic to some degree as long as the applied load does not cause it to deform permanently. Thus, the "flexibility" of any object or structure depends on its elastic modulus and geometric shape. The modulus of elasticity for a material is basically the slope of its stress-strain plot within the elastic range.

Asphalt has been the subject of exhaustive study to improve characteristics for use in paving. Various properties of asphalt are manipulated to produce a product that has the appropriate wear properties, rut resistance, fatigue and low temperature cracking resistance, adhesion strength, viscosity and pour point. Rut resistance is resistance to longitudinal surface depressions in the wheelpaths. Adhesion strength is the maximum adhesion strength of the joint sealant and the joint reservoir, including but not limited to, between the aggregate and the binder. Shove resistance is resistance to permanent, longitudinal displacement of a localized area of the pavement surface caused by traffic pushing against the pavement. Heavy hydrocarbon that can be derived from, without limitation, natural asphalt (such as Gilsonite®), shale asphalt, bottoms from a solvent deasphalting process, hard asphalt, blown asphalt, stiff refined asphalt, a flux. Asphalt is usually the base ingredient for the primer and the binder. A primer can be asphalt, fibers (including but not limited to, mineral or cellulose), processing agent (including but not limited to, oligomeric wax, carboxilated, derivative of oligomeric wax, or low molecular weigh polyolefins), polymeric or elastomeric additive, or asphalt-derived. A primer melts to the aggregate. Asphalt binders without polymers are referred to as "neat".

In view of the foregoing, asphaltic concrete mixtures, asphaltic binders, and methods of preparing the asphaltic concrete mixtures are provided as embodiments of the present invention. For example, as an embodiment of the present invention, an asphaltic concrete mixture with improved properties relative to rutting, deformation, stability, and modulus is provided. In this embodiment, the asphaltic concrete mixture includes heavy oil fly ash and asphaltic concrete. The heavy oil fly ash is present in a range of about 3 wt. % to about 10 wt. % of the asphaltic concrete mixture. The asphaltic concrete comprises aggregate and bitumen.

In embodiments of the present invention, the heavy oil fly ash contains more than about 90 wt. % carbon. The heavy oil fly ash is producing by burning fuel oil. In an aspect, the heavy oil fly ash is a combustion reaction product formed through burning fuel oil.

As an embodiment of the present invention, another asphaltic concrete mixture with improved properties relative to rutting, deformation, stability, and modulus is provided. In this embodiment, the asphaltic concrete mixture includes heavy oil fly ash and asphaltic concrete. The heavy oil fly ash is present in a range of about 3 wt. % to about 10 wt. % of the asphaltic concrete mixture. The asphaltic concrete includes about 95 parts by weight aggregate and about 5 parts by weight bitumen. In this embodiment, the asphaltic concrete mixture is substantially free of a polymeric modifier.

In embodiments of the present invention, the asphaltic concrete mixture includes aggregate and bitumen. The amounts of each of the components can vary, depending upon the source of the asphaltic concrete mixture. In an aspect, the asphaltic concrete can include about 95 parts by weight aggregate and 5 parts by weight bitumen. Other suitable amounts of each component will be apparent to those of skill in the art and are to be considered within the scope of the present invention.

In embodiments of the present invention in which the asphaltic concrete mixture includes heavy oil fly ash, the heavy oil fly ash can be present in an amount of about 3 wt. % to about 6 wt. %. When the heavy oil fly ash is present in this range, the asphaltic concrete mixture composition can be PG graded as 70-10. When the heavy oil fly ash is present in an amount of about 10 wt. %, the composition can be PG graded as 76-10. Other suitable amounts of heavy oil fly ash and their corresponding PG grading will be apparent to those of skill in the art and are to be considered within the scope of the present invention.

Asphalt performance grade is improved with commercial modifiers such as polymers that are expensive and not available in many countries. Modified asphalt will also improve the rutting resistant of the highways. Both performance grade and rutting resistance can be attained with modifying the asphalt with heavy oil fly ash (HOFA). Modifying asphalt with up to 6 wt. % HOFA will increase its Performance Grade (PG) and reduces its deformation under traffic loads without affecting its fatigue life. Use of HOFA solves the problem of the unavailability of asphalt modifiers. Use of HOFA, which can be local byproduct materials, will help in reducing the cost associated with disposing of HOFA.

As a benefit of using the compositions of the present invention, typical polymeric modifiers are not needed. In an aspect, the asphaltic concrete mixture is free of a polymeric modifier. The developed modified asphalt with the use of HOFA improved the performance grade (PG) from 64-10 to 70-10 and eliminated the use of commercial modifier and improved the rutting resistance of the mix.

The physical properties of the asphaltic concrete mixture can vary depending on the amount of each component used to produce the mixture. For example, the asphaltic concrete mixture can have a Marshall stability that ranges from about 10.5 kN to about 14.6 kN. As another example, the asphaltic concrete mixture can have a resilient modulus that ranges from about 400 psi to about 580 psi. As yet another example, the asphaltic concrete mixture can show rutting of less about 5 mm at 8000 load repetitions. Other suitable ranges and types of physical properties will be apparent to those of skill in the art and are to be considered within the scope of the present invention.

As another embodiment of the present invention, a binder composition comprising a heavy oil fly ash composition for use with asphaltic concrete for improved properties relative to rutting, deformation, stability, and modulus is provided. The heavy oil fly ash includes a combustion reaction product formed through burning fuel oil. As with other embodiments of the present invention, the heavy oil fly ash composition includes more than about 90 wt. % carbon.

Besides composition embodiments, methods of preparing the composition are also provided as embodiments of the present invention. For example, a method of preparing an asphalt concrete composition with improved properties relative to rutting, deformation, stability, and modulus is provided. In this embodiment, the method includes the steps of preparing a binder comprising a heavy oil fly ash. The heavy oil fly ash is generally present in an amount effective to provide sufficient resistance to deformation for the composition. The binder is combined with bitumen to produce a modified bitumen. The modified bitumen is then combined with aggregate to produce the asphalt concrete composition.

As another example, as an embodiment, a method of preparing an asphalt concrete composition with improved properties relative to rutting, deformation, stability, and modulus is provided. In this embodiment, the method includes preparing a binder comprising a heavy oil fly ash and combining the binder with asphalt concrete to produce the asphalt concrete composition. The heavy oil fly ash is present in an amount effective to provide sufficient resistance to deformation for the composition. The asphalt concrete comprises aggregate and bitumen.

Heavy Oil Fly Ash

Large quantities of heavy oil fly ash (OFA) are produced with combustion of heavy or cracked fuel oil at power generation facilities. This quantity is expected to increase with the further increase in the use of heavy or cracked oil or use of inefficient power generation facilities. Therefore, there is a strong desire to utilize this byproduct in the construction industry. The utilization of HOFA in construction materials provides an outlet for this byproduct material, protects the environment, and eliminates the need for building special areas to dispose of HOFA.

Use of HOFA in asphalt compositions provides properties comparable to polymeric binders without the associated costs of such polymers. For example, modifying asphalt with up to 6 wt. % HOFA will reduce its deformation resistance by more than 30% and increase the life span of roads and highways that are susceptible to failure due to rutting.

The heavy oil fly ash used in embodiments of the present invention is a by-product of the fuel combustion process, including combustion of coal and fuel oil. Heavy oil fly ash (OFA) is typically a black powder type of waste material that results from use of crude and residual oil for power generation. The collected quantities of heavy oil fly ash must be disposed of properly. Instead of disposing of the HOFA, the HOFA can be used in embodiments of the present invention as a modifier for conventional asphalt binder or introduced to the asphalt concrete mix as filler.

The physical properties of the modified binder with HOFA are comparable with conventional asphalt and with polymer modified asphalt including performance grading. In addition, asphalt concrete mixes modified with the HOFA are comparable with mixes made with conventional asphalt and polymer modified asphalt. As a result of using the compositions and method of the present invention, the Performance Grading (PG) of plain asphalt increased by the addition of HOFA from 64-10 to 70-10 at about 3 wt. % to about 6 wt. % HOFA and to 76-10 at about 10 wt. % HOFA. Adding up to 6 wt. % HOFA to asphalt cement binder improved the performance of the asphalt concrete mix by increasing its Marshall Stability, tensile strength resilient modulus and reducing its rutting by up to 31% without affecting the fatigue resistance of the mix.

The heavy oil fly ash can contain various elements. For example, Table 1 presents a typical chemical analysis of HOFA. The amounts of each element can vary depending upon the source of the heavy oil fly ash.

TABLE 1

Elemental composition of HOFA by EDXA

| Element | Weight, % |
|---|---|
| Carbon | 92.5 |
| Magnesium | 0.79 |
| Silicon | 0.09 |
| Sulfur | 5.80 |
| Vanadium | 0.61 |

As can be seen in Table 1, the elemental composition of the HOFA used in embodiments of the present invention is substantially different than traditional fly ash that has been used in the construction industry. Traditional fly ash is generally produced by manually burning coal. The main chemical components are more than about 70 wt. % silicon dioxide ($SiO_2$), aluminum oxide ($Al_2O_3$), and iron oxide ($Fe_2O_3$) and is in accordance with ASTM C 618. The HOFA used in embodiments of the present invention contains more than about 90 wt. % carbon because it is formed by burning fuel oils by machines.

It is envisioned that embodiments of the present invention can be used by construction companies world wide. The heavy oil fly ash-modified asphalt could be utilized in the preparation of asphaltic concrete mixtures and improve the physical properties of such compositions.

EXAMPLES

Several blends were prepared for comparison purposes. Blend No. 1 and 2 were prepared in accordance with embodiments of the present invention. Blend No. 3 was prepared in accordance with prior are embodiments.

TABLE 2

Composition of mixes coding

| Blend No. | Blend | Blend Code | % HOFA |
|---|---|---|---|
| 1 | (AC + OFA) + Agg. | 1(0) | 0% HOFA |
| | | 1(3) | 3% HOFA |
| | | 1(6) | 6% HOFA |
| | | 1(10) | 10% HOFA |
| 2 | AC + (OFA + Agg.) | 2(0) | 0% HOFA |
| | | 2(1) | 1% HOFA |
| | | 2(2) | 2% HOFA |
| | | 2(3) | 3% HOFA |
| 3 | 5% Polybilt Polymer + AC | | PB |

Where:
(AC) = asphalt/bitumen
(AC + OFA) means the asphalt/bitumen was mixed with the heavy oil fly ash first then mixed with aggregates Performance Grade (PG)

The viscosity and performance grade were determined for the blends described in Table 2. The results of the viscosity and performance grade determinations are shown in Table 3.

TABLE 3

Performance grade of HOPA-asphalt binders

| Blend Code | Viscosity @ 135° C., cP | Performance Grade (PG) |
|---|---|---|
| 1(0) | 520 | 64-10 |
| 1(3) | 700 | 70-10 |
| 1(6) | 820 | 70-10 |
| 1(10) | 990 | 76-10 |
| (PB) Polymer Modified Asphalt | 894 | 76-10 |

* 4 and 5% HOFA will also produce PG 70-10 since both 3 and 6% produced a binder with PG 70-10

Stability and Stability Loss

Stability data was obtained from the blends described in Table 2. The stability data is shown in Table 4.

TABLE 4

Performance grade of HOFA-asphalt binders

| Blend Code | Stability (KN) | Stability Loss % |
|---|---|---|
| 1(0) | 9.9 | 19.3 |
| 1(3) | 10.6 | 23.3 |
| 1(6) | 11.4 | 23.8 |
| 1(10) | 14.5 | 28.5 |
| 2(1) | 9.7 | 28.4 |
| 2(2) | 8.9 | 21.3 |
| 2(3) | 10.8 | 50.3 |
| PB | 10.7 | 24 |

The blends having Blend Codes 1(0), 1(3), 1(6), and 1(10) in which HOFA was added to plain asphalt resulted in a steady increase of Marshall stability from 9.9 kN at 0 wt. % HOFA to 14.5 kN at 10 wt. % HOFA. Stability loss increased from 19.3% at 0 wt. % HOFA to 28.5% at 10 wt. % HOFA.

The blends having Blend Codes 2(1), 2(2), and 2(3) in which the HOFA was added as a filler replacement to plain asphalt mixes did not yield significant improvement to stability. Stability loss increased from 19.3% at 0 wt. % HOFA to 50.3% at 3 wt. % HOFA.

The prior art blend having Blend Code PB that included a polybilt modified mix had a Marshall stability of 10.7 kN and stability loss of 24%.

Indirect Tensile Strength

Indirect Tensile Strength (ITS) test (AASHTO T-245) was also carried out in order to explore mix resistance to the development of cracks. The ITS was performed on cylindrical specimens of 2½-inch height by 4-inch diameter (63.5-mm height by 101.6-mm diameter). The specimens were prepared following Marshall Compaction method. The maximum load the specimen would carry before failure was determined (known as the ITS). The tests were carried out at 25° C. The results of the tested specimens are presented in Table 5.

TABLE 5

Indirect Tensile Strength

| Blend Code | TSI (N/cm$^2$) |
| --- | --- |
| 1(0) | 98.1 |
| 1(3) | 105.6 |
| 1(6) | 91.9 |
| 1(10) | 95.1 |
| 2(1) | 76.6 |
| 2(2) | 79.9 |
| 2(3) | 45.4 |
| PB | 102.4 |

As can be see in Table 5, ITS for Blend-1 mixes are relatively similar with minor variations. The ITS for Blend-2 mixes dropped steadily from 98.1 N/cm$^2$ at 0 wt. % HOFA to 45.4 N/cm$^2$ at 3 wt. % HOFA. The ITS for the polybilt modified mix (PB) was 102.4 N/cm$^2$.

Resilient Modulus Test, MR (ASTM D 4123)

Resilient modulus is a variable used in the mechanistic design approaches of pavement structures. It is the measure of pavement response in terms of dynamic stresses and corresponding resulting strains. Resilient modulus testing of hot-melt asphalt (HMA) was conducted by applying diametral pulse loads. The load was applied in the vertical diametrical plane of a cylindrical specimen of 2½-inch height by 4-inch diameter (63.5-mm height by 101.6-mm diameter). The specimens were prepared according to Marshall compaction method. The resulting horizontal deformation of the specimens was measured and used to calculate resilient modulus. The test was performed on the blends listed in Table 2 at 25° C. and the results are shown Table 6.

TABLE 6

Resilient Modulus

| Blend Code | TSI (Ksi) |
| --- | --- |
| 1(0) | 349.4 |
| 1(3) | 400.7 |
| 1(6) | 461.9 |
| 1(10) | 575.8 |
| 2(1) | 401.7 |
| 2(2) | 477.3 |
| 2(3) | 211.9 |
| PB | 400 |

As shown in Table 6, the resilient modulus of Blend-1 increased as the percentage of HOFA increased. Resilient modulus increased from 349.4 ksi at 0 wt. % HOFA to 575.8 ksi at 10 wt. % HOFA. The resilient modulus of Blend-2 increased from 349.4 ksi at 0 wt. % HOFA to 477.3 ksi at 2 wt. % HOFA then dropped to 211.9 ksi at 3 wt. % HOFA. The polybilt modified mix (PB) had a resilient modulus of 400 ksi.

Based on Marshall stability, loss of stability, ITS and resilient modulus tests, one combination was selected for each blend for further evaluation in addition to plain asphalt, and the polybilt modified (PB) asphalt mixes. The selected combinations were Blend-1 with 6 wt. % HOFA with resilient modulus of 461.9 ksi, ITS of 91.9 N/cm$^2$, Marshall stability of 11.4 kN, and percent stability loss of 23.4 and Blend-2 with 2 wt. % HOFA with resilient modulus of 477.3 ksi, ITS of 79.9 N/cm$^2$, Marshall stability of 8.9 kN, and percent stability loss of 21.3. The blends were further subjected to performance testing to explore their fatigue and permanent deformation behavior.

Rutting Test (Permanent Deformation)

Plain and modified asphalt mixes were evaluated for rutting resistance using an asphalt pavement analyzer (APA) at 64° C. Wheel load was set to 100 lb, and wheel pressure was set to 100 psi. Six-inch test samples were compacted using a gyratory compactor to the same density of Marshall samples. Test samples were conditioned at test temperature for 4 hrs.

As shown in the test results in FIG. 1, plain asphalt concrete mix gave the highest rutting of 6.5 mm at 8000 load repetitions. The next highest rutting was given by Polymer (Polybilt) Modified Asphalt (PB) modified asphalt mix of 5.5 mm at 8000 load repetitions. Blend-1 with 6 wt. % HOFA and Blend-2 with 2 wt. % HOFA ranked third with rutting of 4.5 mm at 8000 load repetitions.

Fatigue Test

Flexural fatigue test, AASHTO T-321 (TP8-94) was used to test for fatigue properties of the prepared asphalt concrete beam samples. Samples were tested in a stress controlled mode to simulate asphalt pavement thick layer construction used locally. Six samples, at least, were tested under different bending peak to peak stresses (kPa). Corresponding peak to peak strains $\times 10^{-6}$ were calculated by the software.

Asphalt concrete slabs (38 cm×30 cm×6.6 cm) were compacted to the density of optimum asphalt mixes using a slab compactor. Slabs were cut into beam samples (38 cm×6.6 cm×5.0 cm) using a masonry saw. Beam samples were conditioned at the test temperature and tested for flexural fatigue test (Beam Test), following AASHTO T-321. Fatigue testing has been accomplished for optimized mixes at 25° C.

As the asphalt concrete beam sample was subjected to load repetitions, stiffness decreased rapidly at the start and then reached a constant slope until failure of the beam, which is defined as 40% of initial stiffness. The collected data was analyzed to determine the relationship between load repetition to failure (N) and applied peak to peak stress ($\sigma$) or initial peak to peak strain ($\epsilon$). Table 7 shows the relationship between load repetition (N) and initial strain ($\epsilon$) for the tested mixes. Similarly, Table 8 shows the relationship between load repetition (N) and applied stress ($\sigma$).

TABLE 7

Relationship between applied tensile strain and fatigue of tested mixes at 25° C. at 200 micro strain

| Blend Code | Load Repetition |
| --- | --- |
| 1(0) | 300,000 |
| 1(6) | 300,000 |
| 2(2) | 2,000 |
| PB | 900,000 |

TABLE 8

| Blend Code | Load Repletion |
|---|---|
| 1(0) | 100,000 |
| 1(6) | 100,000 |
| 2(2) | 1,500 |
| PB | 1,000,000 |

Relationship between applied tensile stress and fatigue of tested mixes at 25° C. at 600 Kpa As shown in Tables 7 and 8, at a given strain or stress level, the Polybilt modified blend (PB) has the highest fatigue life. At a given strain or stress level, plain asphalt and Blend-1 with 6 wt. % HOFA ranked second for fatigue resistance. At a given strain level, Blend-2 with 2 wt. % HOFA performed the best and gave the least fatigue resistance.

As an advantage of the present invention, the compositions and methods described herein are less expensive and more environmentally friendly than conventional asphalt compositions. Asphalt modifiers such as polymers that improve the Performance Grade (PG) of the binder and reduce the rutting of the asphalt concrete mix under traffic loads are more expensive than the heavy oil fly ash used in embodiments of the present invention. Furthermore, traditional polymeric binders are not available in many countries. In such situations, the utilization of heavy oil fly ash as an asphalt modifier leads to considerable cost savings. Also, the use of heavy oil fly ash, which is an industrial waste product, reduces the cost associated with disposing it safely, which makes the compositions and methods of the present invention much more environmentally friendly than traditional binders.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An asphaltic concrete mixture with improved properties relative to rutting, deformation, stability, and modulus, the asphaltic concrete mixture comprising:
   a. heavy oil fly ash, the heavy oil fly ash being present in a range of about 3 wt. % to about 10 wt. % of the asphaltic concrete mixture; and
   b. asphaltic concrete, wherein the asphaltic concrete comprises about 95 parts by weight aggregate and 5 parts by weight bitumen.

2. The asphaltic concrete mixture of claim 1, wherein the heavy oil fly ash comprises greater than about 90 wt. % carbon.

3. The asphaltic concrete mixture of claim 1, wherein the heavy oil fly ash is present in an amount of about 3 wt. % to about 6 wt. % and the composition is PG graded as 70-10.

4. The asphaltic concrete mixture of claim 1, wherein the heavy oil fly ash is present in an amount of about 10 wt. % and the composition is PG graded as 76-10.

5. The asphaltic concrete mixture of claim 1, wherein the asphaltic concrete mixture is free of a polymeric modifier.

6. The asphaltic concrete mixture of claim 1, wherein the asphaltic concrete mixture has a Marshall stability that ranges from about 10.5 kN to about 14.6 kN.

7. The asphaltic concrete mixture of claim 1, wherein the asphaltic concrete mixture has a resilient modulus that ranges from about 400 psi to about 580 psi.

8. The asphaltic concrete mixture of claim 1, wherein the asphaltic concrete mixture shows rutting of less about 5 mm at 8000 load repetitions.

9. An asphaltic concrete mixture with improved properties relative to rutting, deformation, stability, and modulus, the asphaltic concrete mixture comprising:
   a. heavy oil fly ash comprising greater than about 90 wt. % carbon, the heavy oil fly ash being present in a range of about 3 wt. % to about 10 wt. % of the asphaltic concrete mixture; and
   b. asphaltic concrete, the asphaltic concrete comprising about 95 parts by weight aggregate and about 5 parts by weight bitumen;
   wherein the asphaltic concrete mixture is substantially free of a polymeric modifier.

10. The asphaltic concrete mixture of claim 9, wherein the heavy oil fly ash is present in an amount of about 3 wt. % to about 6 wt. % and the composition is PG graded as 70-10.

11. The asphaltic concrete mixture of claim 9, wherein the heavy oil fly ash is present in an amount of about 10 wt. % and the composition is PG graded as 76-10.

12. The asphaltic concrete mixture of claim 9, wherein the asphaltic concrete mixture has a Marshall stability that ranges from about 10.5 kN to about 14.6 kN.

13. The asphaltic concrete mixture of claim 9, wherein the asphaltic concrete mixture has a resilient modulus that ranges from about 400 psi to about 580 psi.

14. The asphaltic concrete mixture of claim 9, wherein the asphaltic concrete mixture shows rutting of less about 5 mm at 8000 load repetitions.

* * * * *

UNITED STATES PATENT AND TRADEMARK OFFICE
CERTIFICATE OF CORRECTION

| | | |
|---|---|---|
| PATENT NO. | : 8,062,413 B1 | Page 1 of 1 |
| APPLICATION NO. | : 12/917043 | |
| DATED | : November 22, 2011 | |
| INVENTOR(S) | : Mohammed Al-Mehthel, Hamad I. Al-Abdul Wahhab and Ibnelwaleed A. Hussein | |

It is certified that error appears in the above-identified patent and that said Letters Patent is hereby corrected as shown below:

Title page item [73]
Add second Assignee: "King Fahd University of Petroleum and Minerals (SA)"

Signed and Sealed this
Thirteenth Day of March, 2012

David J. Kappos
*Director of the United States Patent and Trademark Office*